W. W. ROBERTS.
TREE COVER.
APPLICATION FILED MAY 13, 1909.
935,057.
Patented Sept. 28, 1909.
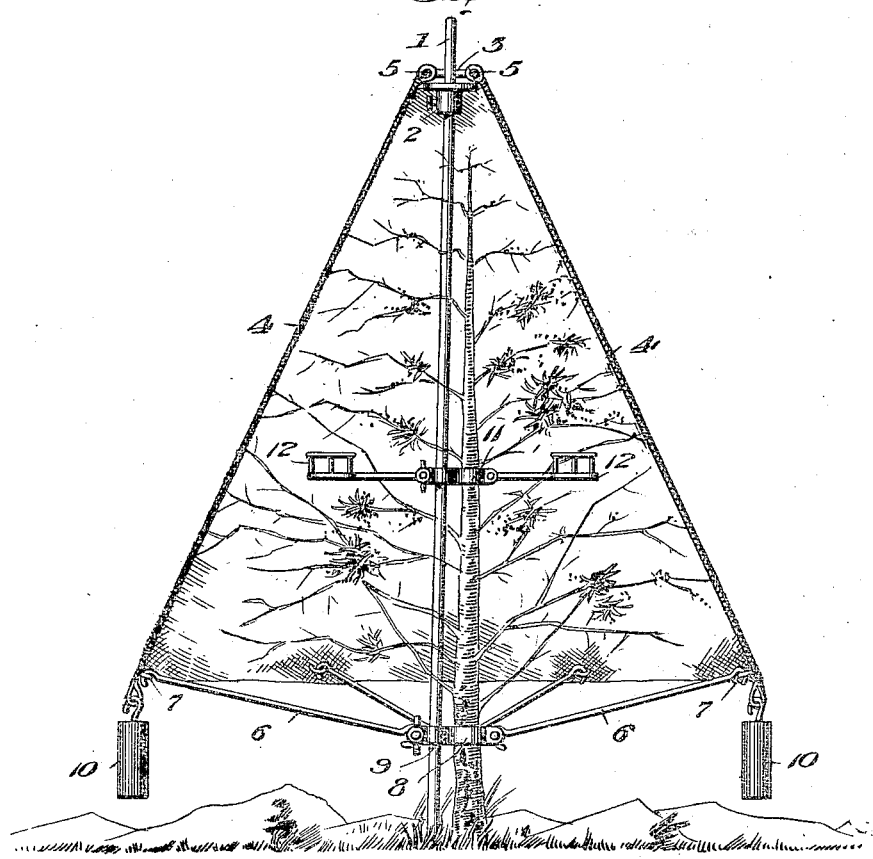
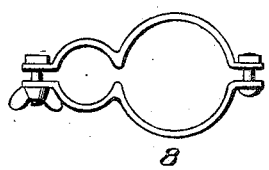
Inventor
William W. Roberts

UNITED STATES PATENT OFFICE.

WILLIAM W. ROBERTS, OF FLAT RIVER, MISSOURI.

TREE-COVER.

935,057.

Specification of Letters Patent. Patented Sept. 28, 1909.

Application filed May 13, 1909. Serial No. 495,821.

*To all whom it may concern:*

Be it known that I, WILLIAM W. ROBERTS, a citizen of the United States, residing at Flat River, county of St. Francois, and State of Missouri, have invented certain new and useful Improvements in Tree-Covers, of which the following is a specification.

My invention relates to tree covers.

The present invention relates to that class of devices which are used to protect trees from atmospheric changes and has for its object the provision of a device of this character which will be of simple, inexpensive, and strong construction and adapted to be rapidly and easily placed in position or removed from the tree and sustain the curtains which house the tree so that they will not damage the branches of the tree.

The invention contemplates the provision of a staff or pole adapted to be positioned beside the tree, a cover to house the tree, which is suspended from the pole or staff, ribs or supports for holding the cover in extended condition so that it will not damage the branches of the tree, and other instrumentalities which constitute a novel and effective cover and protector whereby the tree will be completely housed and can be kept at the desired temperature and protected from frost, wind, changes in temperature, etc.

The invention is set forth fully hereinafter and the novel features are recited in the appended claims.

In the accompanying drawings: Figure 1 is a view showing the protector in use, the curtains being shown in section; and Fig. 2 is a detail of the split ring.

The invention contemplates the use of an upright pole or staff 1 adapted to be positioned beside the tree to be protected, said staff having a vertically adjustable support 2 which can be raised or lowered according to the height of the tree and which constitutes a rest for a ring 3 to which the curtains 4 are connected in any preferred manner as at 5. To keep the curtains distended so that they will not flap against or damage the branches of the tree, there are provided ribs 6 which are detachably connected to the curtains at 7, their inner ends being detachably connected to a split ring 8 which can be clamped around the tree and engage with the staff at 9. The curtains are provided with detachable weights 10 to hold them down.

If desired, a lamp support consisting of a split ring 11 and lamp brackets 12 may be used, the split ring encircling the tree and being engaged with the staff 1.

On account of the detachable connections between the parts, the protector can be readily taken apart or set up and when bundled, occupies but small space.

Having thus described my invention, what I claim as new and desire to secure by Letters Patent, is:—

1. In a tree protector, the combination with an upright pole or staff, of a cover suspended from said staff, ribs for distending the cover, and a ring encircling the tree and affording a support for the inner ends of the ribs.

2. In a tree protector, the combination with an upright staff or pole and a cover depending therefrom, of a heater support having a ring engaged with the pole and tree.

3. In a tree protector, the combination with an upright pole or staff, of a freely depending cover adapted to house the tree, means for supporting said cover from its upper part only, means connecting the staff or pole to the tree, ribs connected to said fastening means and to the cover, said ribs being adapted for distending the cover, and weights depending from the cover and adapted to hold it in position.

In testimony whereof, I hereunto affix my signature in presence of two witnesses.

WILLIAM W. ROBERTS.

Witnesses:
T. J. BUCKNER, Jr.,
BRADLEY B. SHEFF.